United States Patent
Lancaster et al.

(10) Patent No.: US 7,128,035 B2
(45) Date of Patent: Oct. 31, 2006

(54) METHOD AND APPARATUS FOR ENGINE TORQUE DISTURBANCE REDUCTION DURING CRANKING

(75) Inventors: David R. Lancaster, Troy, MI (US); Mark G. Kosowski, Rochester Hills, MI (US); Mark A. Theobald, Bloomfield Hills, MI (US); James A. Cogswell, II, Clarkston, MI (US); Bryan R. Snyder, Waterford, MI (US); John P. Miller, Northville, MI (US); David J. Freiman, Ann Arbor, MI (US)

(73) Assignee: General Motors Corporation, Detroit, MI (US)

( * ) Notice: Subject to any disclaimer, the term of this patent is extended or adjusted under 35 U.S.C. 154(b) by 50 days.

(21) Appl. No.: 11/076,742

(22) Filed: Mar. 10, 2005

(65) Prior Publication Data

US 2006/0201468 A1    Sep. 14, 2006

(51) Int. Cl.
*F02N 17/00* (2006.01)

(52) U.S. Cl. .................................. 123/178.18
(58) Field of Classification Search ............ 123/179.3, 123/179.16, 179.18, 685; 60/289, 290
See application file for complete search history.

(56) References Cited

U.S. PATENT DOCUMENTS

| | | | | |
|---|---|---|---|---|
| 4,177,784 | A * | 12/1979 | Tatsutomi et al. | 123/179.18 |
| 5,417,109 | A * | 5/1995 | Scourtes | 73/116 |
| 6,763,803 | B1* | 7/2004 | Wild et al. | 123/361 |
| 6,863,048 | B1* | 3/2005 | Burkhard et al. | 123/399 |

* cited by examiner

Primary Examiner—Stephen K. Cronin
Assistant Examiner—Arnold Castro
(74) Attorney, Agent, or Firm—Christopher DeVries

(57) ABSTRACT

An internal combustion engine's start-up torsional disturbances are reduced by drawing down intake manifold pressure prior to engine cranking. In a preferred arrangement, a secondary air injection reaction pump is adapted for evacuating the intake manifold to effect the desired draw down of the intake manifold pressure.

19 Claims, 1 Drawing Sheet

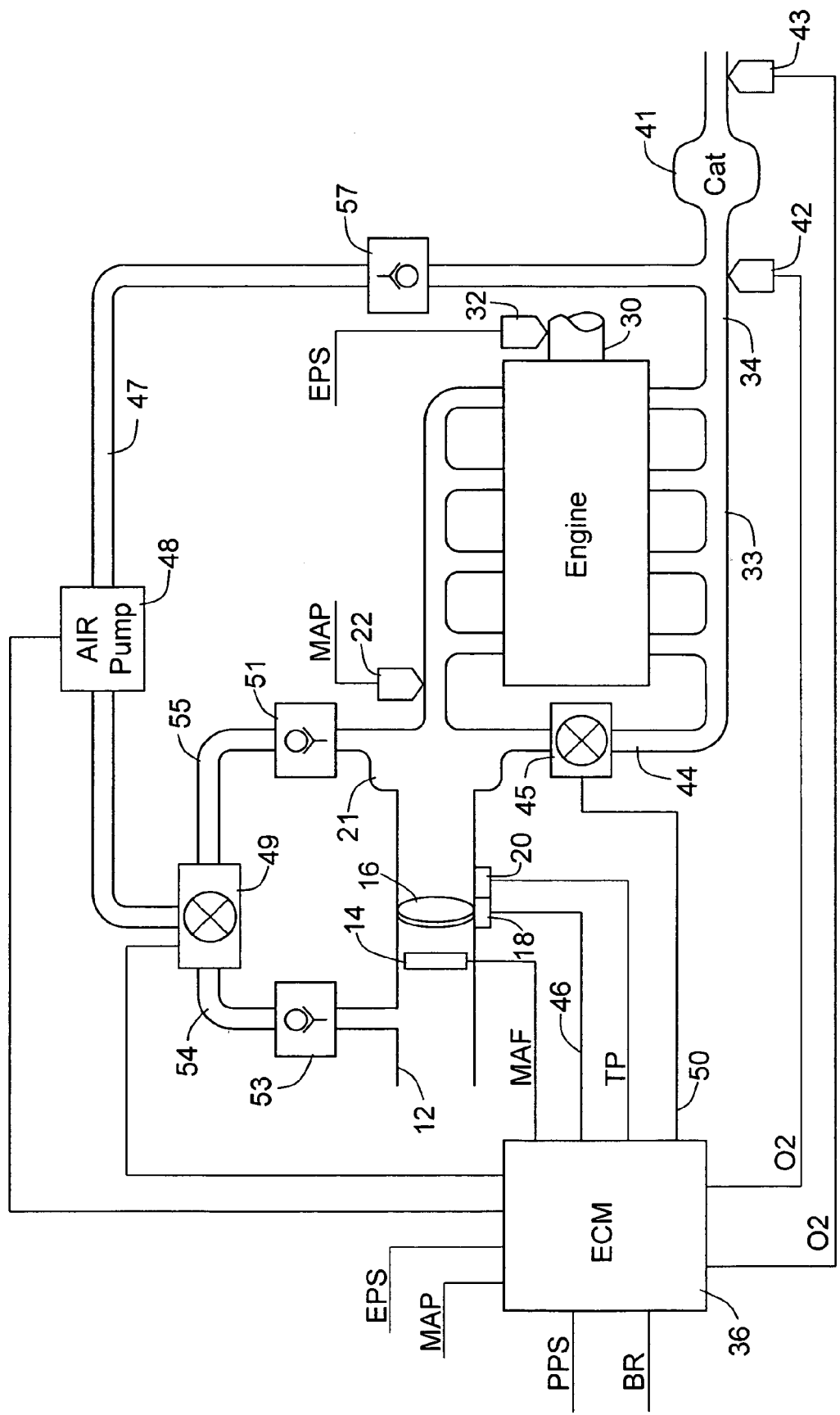

METHOD AND APPARATUS FOR ENGINE TORQUE DISTURBANCE REDUCTION DURING CRANKING

TECHNICAL FIELD

The present invention is related to internal combustion engines. More particularly, the invention is concerned with internal combustion engine start-up.

BACKGROUND OF THE INVENTION

Improvements in noise, vibration and harshness (NVH) in automobile systems, significantly in the area of powertrain systems including engines, transmission and other driveline components, are always being sought. One readily identifiable source of NVH can be attributed to torsional torque disturbances induced by relatively high compression and expansion forces acting upon the engine's pistons during a start-up sequence prior to ignition (i.e. engine cranking). Since engine cranking historically has been a relatively infrequent and temporally limited event—typically one per driving cycle—improving NVH from other sources has been given higher priority. However, the emergence of automobiles, particularly hybrid electric vehicles, that enable engine shut-down during periods of vehicle operation when it is not required (e.g. traffic signal idle) has required significantly more frequent engine starts during a normal driving cycle. The engine starts are effected without conventional operator interaction (i.e. rotation of ignition lock cylinder). That is to say, engine starts may be effected, for example, subsequent to the operator releasing the vehicle service brake pedal and depressing the vehicle accelerator pedal. Additionally, engine starts may be effected to satisfy various vehicle demands including, for example, battery state-of-charge maintenance and exhaust catalyst thermal management. While such technological advances can significantly and favorably impact overall vehicle fuel economy and tailpipe emissions, a relatively new source of potentially objectionable NVH to the operator has been created thereby.

Engine starting sequence NVH may be improved in some engines through advanced valvetrain controls. For example, single cylinder engine starts wherein all cylinders save one are mechanically deactivated may show NVH improvements. Likewise, cam phasing may be employed to reduce compression pressures during engine starts with the same improvement objective. However, such solutions require additional valvetrain complexity and expense and are not implementable in engines having conventional valvetrain hardware.

SUMMARY OF THE INVENTION

Therefore, it is generally desirable to minimize NVH from all sources in an automobile. In automobiles that are likely to have increased engine start-up cycles, there is increasingly more impetus to address sources of NVH attributable to engine cranking. Cost effective improvements to engine cranking related NVH are very desirable and particularly desirable are solutions not requiring engine valvetrain modifications and associated expense and complexity.

An internal combustion engine includes an intake manifold and a plurality of combustion chambers. In accordance with the method of the present invention, the engine is started in a manner to reduce torsional disturbances by drawing down the pressure within the intake manifold prior to engine cranking including the forced rotation of the engine, and provision and combustion of a combustible fuel charge to the combustion chambers. An electric pump is controlled to evacuate the intake manifold prior to cranking. Preferably, a secondary air injection pump is adapted for this evacuation. It is also advantageous to close off all leak paths to the intake manifold before evacuation. Therefore, it is also desirable to close any intake throttle valve, exhaust gas recirculation valve or other controllable valve associated with any such leak path.

Accordingly, a starting apparatus in accordance with the present invention includes a pump selectively coupled to the intake manifold and operative to evacuate the intake manifold prior to engine cranking. Such an apparatus further includes an engine cranking apparatus operative to force rotation of the engine, provide a combustible air and fuel mixture to the combustion chambers and combust the combustible air and fuel mixture within the combustion chambers. The starting apparatus advantageously further includes an intake throttle valve which is substantially closed during evacuation of the intake manifold. The engine cranking apparatus may further include a spark-ignition system operative to provide an ignition spark to initiate combustion of the combustible air and fuel mixture within the combustion chambers. The starting apparatus may further include a conduit to route gases evacuated from the intake manifold by the pump into an exhaust conduit of the engine. Preferably, the pump is a secondary air injection reaction pump adapted for intake manifold evacuation.

An article of manufacture in accordance with the present invention includes program instructions therein for starting an automotive internal combustion engine having an intake manifold. The program instructions include code for evacuating the intake manifold prior to engine cranking, code for cranking the internal combustion engine, and a computer readable medium that stores the code. The code for cranking the internal combustion engine may further includes code for controlling an electric machine operative to force rotation of the engine, code for controlling a fuel delivery system operative to provide fuel to the engine during forced rotation thereof, and code for controlling a spark delivery system operative to provide spark to the engine during forced rotation thereof. The engine may further includes an intake throttle valve and the code for evacuating the intake manifold may further include code for closing the intake throttle valve, and code for controlling a pump operative to evacuate the intake manifold.

BRIEF DESCRIPTION OF THE DRAWING

The drawing is now referred to which is meant to be exemplary and not limiting, wherein the figure is a schematic representation of an exemplary internal combustion engine system for illustrating a preferred embodiment of the present invention.

DESCRIPTION OF THE PREFERRED EMBODIMENT

Reference is now made to the figure wherein an engine control module (ECM) 36 is a microcontroller-based device with standard control and logic circuitry and standard memory devices including read-only memory devices in which are stored a plurality of routines for carrying out engine control and diagnostic operations, including routines for carrying out operations for implementing the method of the present invention. Each routine includes a sequence of instructions that are executed by the microcontroller following pre-established engine events or on a timed basis. Such routines, which may be repeatedly executed following each successive engine cylinder event while the engine is operating—including during engine start-up sequences—include fuel control and spark timing routines for generating and issuing fuel and spark timing commands. These commands are provided to respective fuel controllers and ignition controllers (not separately illustrated) for controlling fuel delivery and ignition timing for each cylinder event, including during engine start-up sequences. Such fuel and spark controllers are generally well-known to those skilled in the art.

An operator-controlled accelerator pedal (not shown), a.k.a. throttle pedal, is manually depressed by a vehicle operator to indicate a desired engine operating level. The degree of depression of the pedal away from a rest or low angle position is transduced by conventional potentiometric position sensor (not shown) into output signal PPS, which is provided as a control input to ECM 36 as an indication of a desired engine operating level and as an indication of engine restart sequencing. Throttle actuation and throttle position sensing is accomplished by electronic throttle body throttle actuation hardware and throttle position sensing hardware as follows. An intake air valve position command is converted into a pulse-width-modulated (PWM) actuator drive signal on line 46 for commanding output shaft of actuator 18 toward a desired rotational position. Intake air valve position signal TP is received by the ECM 36 for closed-loop control operations. Alternatively, a separate throttle control module (not shown) includes a conventional controller architecture of such well-known elements as a central processing unit and input/output circuitry. Generally, the throttle control module receives engine operating condition information from the ECM 36 across a bi-directional serial data link, and receives transducer signals and generates, through execution of a series of stored instructions in the form of a control routine, an intake air valve position command (i.e. actuator drive current signal) for commanding output shaft of actuator 18 toward a desired rotational position. In such arrangement, signal TP is received by the throttle control module for closed-loop control operations.

An operator-controlled brake pedal (not shown) is manually depressed by a vehicle operator to indicate a desired vehicle braking level. The degree of brake pedal effort (BR) may, for example, be provided in pneumatic and hydraulic braking systems from conventional pressure transducers (not shown). Brake pedal effort BR is provided as a control input to ECM 36 as an indication of a desired braking level and as an indication of engine restart sequencing.

In normal engine operation, intake air is passed through intake air bore 12 past mass airflow meter 14 of the thick film or hot wire type for transducing engine intake air mass flow rate into output signal MAF. An electronically-controlled intake air valve 16, for example of the butterfly or rotary type, is disposed in intake air bore 12 and rotates therein to vary a degree of restrictiveness of the intake bore 12 to intake air passing there through. An electromechanical actuator 18, for example of the DC motor or stepper motor type includes a rotatable output shaft (not shown) mechanically linked to the valve 16, such as through a gear assembly (not detailed). The rotational position of the output shaft of actuator 18 is controlled through variation in an electrical current command issued by ECM 36, for example through pulse width modulation control of the four gates of a commercially available full H-bridge (not shown) for bi-directional current control. Through timed variation in the magnitude of the current command, high resolution, highly responsive control of engine intake air valve position is provided for engine intake air rate control. Actuator 18 may be any commercially-available high performance electromechanical actuator that provides high performance dynamic positioning, as is well-established as required in electronic throttle control applications under certain engine operating conditions, such as high engine intake air rate (high engine load) operating conditions. The rotational position of the intake air valve 16 is transduced by potentiometric position sensor 20 of any conventional type into output signal TP.

The intake air passing across intake air valve 16 is received in an intake manifold 21 for distribution to intake runners of a plurality of engine cylinders (not shown). Intake air absolute pressure in the intake manifold 21 is transduced by conventional pressure transducer 22 into output signal MAP. Ambient barometric pressure (BARO) is transduced by a conventional barometric pressure sensor (not shown) or, alternatively, under specified operating conditions, such as conditions in which the pressure drop across the intake air valve 16 is substantially zero, is set to the pressure value represented by signal MAP.

The intake air is combined with an injected fuel quantity and delivered to engine cylinders for combustion therein for reciprocally driving pistons (not shown) within the cylinders, the pistons being mechanically linked to an engine output shaft 30 to rotatably drive the output shaft. Fuel is delivered from a conventional fuel system (not illustrated) including a fuel tank or reservoir, fuel pump, fuel lines and rail, and fuel injectors. Any of a variety of fuel injection apparatus may be employed including throttle body injection, port fuel injection or direct cylinder injection. Fuel control routines generate and issue fuel commands in the form of a pulse width corresponding to a desired fuel injector open time during which pressurized fuel is passed through a fuel injector for an active engine cylinder to provide for a desired engine cylinder air/fuel ratio. Fuel commands result in drive currents which are applied to the fuel injector for an active engine cylinder. As described, the injected fuel quantity is mixed with an inlet air quantity in a throttle body, an intake runner or directly in an engine cylinder and is ignited in the engine cylinder.

Engine position is transduced by a rotation sensor 32, for example a conventional Hall effect or variable reluctance transducer, positioned in close proximity to the output shaft to transduce passage of encoded patterns of teeth or notches (not shown) formed on the output shaft into cycles of transducer output signal EPS. From EPS can be derived engine speed (RPM) as conventionally practiced in the art of engine controls Gasses produced in engine cylinders during the combustion process are guided out of the cylinders through exhaust runners to and through exhaust manifold 33 to exhaust gas conduit 34. Combusted gases are passed through catalytic treatment devices 41 which may include conventional three-way catalysts and close-coupled catalysts for improved cold-start emission performance. Pre-catalytic and post-catalytic oxygen sensing is performed by switching or wide range oxygen sensors 42 and 43 to provide oxygen content signals (O2) to ECM 36 for use in closed loop fuel controls as is well known in the art.

An exhaust gas recirculation (EGR) conduit 44 opens, on a first end, into the exhaust manifold 33 and on a second end opposing the first end, into intake manifold 21 to provide for recirculation of exhaust gas from the exhaust manifold into the intake manifold to dilute engine intake air and thereby reduce oxygen content of the intake air and reduce combustion temperatures, consistent with generally recognized procedures to reduce the engine emissions component of oxides of nitrogen NOx. An EGR valve 45 of the electrically-controlled solenoid type is disposed in the recirculation conduit 44 and is responsive to a control signal for varying restriction to flow of exhaust gas through the conduit to provide for control of intake air charge dilution. Potentiometric position sensor (not illustrated) is associated with the valve 45 in such a manner that a movable sensing element such as a wiper arm moves with a pintle (not shown) of the valve 45 to vary sensor output signal (EGRPOS) which indicates the degree of restriction imposed by the controlled valve position. Line 50 represents communication of the EGR position command provided by the ECM 36 and the EGR valve position signal EGRPOS provided to the ECM 36.

A secondary air injection reaction (AIR) conduit 47 opens, on a first end, into exhaust conduit 34 and on a second end into diverter valve 49 of the electrically-controlled solenoid type. An electric AIR pump 48 is disposed in the AIR conduit 47 and is responsive to a control signal from ECM 36 for pumping fresh air through the conduit to exhaust conduit 34. Preferably, the AIR pump motor is brushless and variable speed for durability and controllability, respectively. Diverter valve 49 is in communication with ECM 36 and selectively positioned thereby to couple AIR conduit 47 to one of the intake air bore 12, which is upstream of the intake air valve 16, through upstream conduit 54 or the intake manifold 21, which is downstream of the intake air valve 16, through downstream conduit 55. Check valves 57 and 53 are illustrated in AIR conduit 47 and upstream conduit 54 to prevent undesirable air flows. Alternative controlled valves may be substituted for check valves if desired.

The ECM 36 receives a plurality of input signals including the described transducer and sensor output signals PPS, BR, MAF, MAP, EPS, EGRPOS, O2, TP and BARO, and, through execution of various routines, generates fuel and spark commands, and other control commands including for throttle valve positioning in accordance with an electronic throttle control. Among the engine control routines executed by ECM 36, various routines are executed once for each sensed engine cylinder event. In this context, a cylinder event may be defined as each cylinder torque producing event. Upon the occurrence of each cylinder event which may be indicated by each cyclic EPS signal from sensor 32, present values are generated for a plurality of engine parameters including coolant temperature, engine speed, manifold absolute pressure, engine spark timing and engine air/fuel ratio (during closed loop control). As is generally understood in the art of engine control, the present spark timing value is determined in accord with a variety of conventional engine control goals including engine performance and emissions goals. Air/fuel ratio is determined in response to oxygen sensor input signals O2 which provide an indication of actual engine air/fuel ratio.

The present invention requires that at least one electric motor be operatively coupled to the engine such that the engine can be spun up from a zero speed condition thereby. The motor may couple directly to the engine output shaft or may couple thereto via any variety of gearsets (including reduction gearing) or selectively engageable means such as a starting clutch, range clutch or ring and pinion gear arrangement such as a meshingly engaged starter pinion gear and engine flywheel. The starting motor may be a conventional starter motor engageable to the engine flywheel, an electric machine used primarily as a starter/alternator in mild-hybrid applications or traction motor/generators in other hybrid electric vehicle applications including electrically variable transmissions. As used herein, engine cranking is understood to include forced rotation of the engine such as by an electric machine and engine fueling for combustion torque production.

Under normal cold start operation, the cylinder charge is generally set rich of stoichiometric to aid and ensure stable combustion. Cold start conditions may be determined for example through engine coolant temperature, transmission fluid temperature, engine oil temperature, etc. A rich fuel charge may result in undesirably high unburned hydrocarbon emissions. Conventional three-way catalysts are generally not effective if presented with exhaust gases with excessive unburned hydrocarbons. Additionally, during cold starts, prior to the catalysts achieving light-off temperature, even stoichiometric exhaust gas mixtures are not efficiently treated. Hence, the AIR pump is used to pump fresh air from the intake passage 12 by appropriate positioning of diverter valve 49 into the exhaust conduit 34 for oxidizing the excess hydrocarbons ahead of the catalyst and providing additional heat to the catalyst to achieve faster light-off. The AIR pump may also provide fresh air from the intake passage 12 by appropriate positioning of diverter valve 49 into the exhaust conduit 34 for oxidizing the excess hydrocarbons ahead of the catalyst during other times when the fuel/air ratio may be excessively rich, such as decelerations and wide-open throttle maneuvers. In some engine emission systems, close-coupled catalysts may supplant the need for such air injection by achieving fast light-off of the close coupled catalysts and adequate oxidation of excessively rich fuel/air mixtures.

In accordance with the method and apparatus of the present invention, during an engine start-up sequence, particularly during the frequent restarts in a hybrid vehicle, the diverter valve 49 is positioned to couple intake manifold 21, which is downstream of the intake air valve 16, through downstream conduit 55 to AIR conduit 47. The AIR pump 48 is activated to substantially evacuate the intake manifold prior to and early during the engine cranking which follows. The AIR pump and diverter valve are thereby used to reduce the pressure in the intake manifold prior to and in the initial stages of engine cranking which effects a decrease the engine torque fluctuations during cranking. Such evacuations are most efficiently performed and aided by the closure of any potential leak paths to the intake manifold. For example, it is desirable to control any valves that are coupled to the intake manifold and communicate the intake manifold to atmosphere or significant volumes such as engine crankcase and vacuum reservoirs. Therefore, it is advantageous to close the throttle valve 16 during evacuations. Similarly, it is advantageous to close the EGR valve during evacuations. Controllable crankcase purge valves (not shown) and any other controllable lines that typically rely upon the intake manifold as a vacuum source are also advantageously closed.

The invention has been described with respect to certain preferred embodiments that are intended to be taken by way of illustration of the invention and not by way of limitation. For example, while the invention has been described with respect to a spark-ignited gasoline-fueled engine, it is equally applicable, with appropriate modifications, to gasoline-fueled controlled auto-ignition engines.

The invention claimed is:

1. Method for starting an internal combustion engine including an intake manifold and a plurality of combustion chambers, comprising:
    evacuating the intake manifold; and subsequent to intake manifold evacuation, cranking the engine including
   forcing rotation of the engine,
   providing a combustible air and fuel mixture to the combustion chambers for combustion therein, and
   combusting the combustible air and fuel mixture within the combustion chambers.

2. The method as claimed in claim 1 wherein evacuating the intake manifold comprises closing substantially all leak paths to the intake manifold and pumping the gases out of the intake manifold.

3. The method as claimed in claim 2 wherein said internal combustion engine further includes an intake throttle valve and closing substantially all leak paths to the intake manifold comprises closing the intake throttle valve.

4. The method as claimed in claim 1 wherein said internal combustion engine includes a spark ignition source and combusting the combustible air and fuel mixture within the combustion chambers comprises providing an ignition spark thereto.

5. The method as claimed in claim 4 wherein said internal combustion engine is a spark-ignited engine.

6. The method as claimed in claim 4 wherein said internal combustion engine is a controlled auto-ignition engine.

7. The method as claimed in claim 2 wherein the gases pumped out of the intake manifold are pumped into an exhaust conduit of the internal combustion engine.

8. The method as claimed in claim 7 wherein the gases are pumped out of the intake manifold and into the exhaust conduit of the internal combustion by a secondary air injection reaction pump.

9. The method as claimed in claim 1 wherein evacuating the intake manifold is effected by a secondary air injection reaction pump selectively coupled between the intake manifold and an exhaust conduit of the internal combustion engine.

10. Starting apparatus for an internal combustion engine including an intake manifold, comprising:
a pump selectively coupled to the intake manifold and operative to evacuate the intake manifold prior to engine cranking; and
engine cranking apparatus operative to force rotation of the engine, provide a combustible air and fuel mixture to the combustion chambers and combust the combustible air and fuel mixture within the combustion chambers.

11. The apparatus as claimed in claim 10 further comprising an intake throttle valve which is substantially closed during evacuation of the intake manifold.

12. The apparatus as claimed in claim 10 wherein the engine cranking apparatus further comprises a spark ignition system operative to provide an ignition spark to initiate combustion of the combustible air and fuel mixture within the combustion chambers.

13. The apparatus as claimed in claim 10 further comprising a conduit between the pump and an exhaust conduit of the internal combustion engine effective to route gases evacuated from the intake manifold by the pump into the exhaust conduit.

14. The apparatus as claimed in claim 10 wherein said pump comprises a secondary air injection reaction pump adapted to evacuate the intake manifold.

15. Article of manufacture having program instructions therein for starting an automotive internal combustion engine having an intake manifold, comprising:
   said program instructions comprising;
      code for evacuating the intake manifold prior to engine cranking;
      code for cranking the internal combustion engine; and
   a computer readable medium that stores the code.

16. The article of manufacture as claimed in claim 15 wherein the code for cranking the internal combustion engine further comprises:
   code for controlling an electric machine operative to force rotation of the engine;
   code for controlling a fuel delivery system operative to provide fuel to the engine during forced rotation thereof; and
   code for controlling a spark delivery system operative to provide spark to the engine during forced rotation thereof.

17. The article of manufacture as claimed in claim 15 wherein the engine further includes an intake throttle valve and the code for evacuating the intake manifold further comprises:
   code for closing the intake throttle valve; and
   code for controlling a pump operative to evacuate the intake manifold.

18. The article of manufacture as claimed in claim 15 wherein the engine further includes an exhaust conduit and a secondary air injection reaction pump coupled between the intake manifold and the exhaust conduit, the code for evacuating the intake manifold further comprises:
   code for controlling the secondary air injection reaction pump to evacuate the intake manifold and route gases evacuated from the intake manifold by the secondary air injection reaction pump into the exhaust conduit.

19. The article of manufacture as claimed in claim 18 wherein the engine further includes an intake throttle valve and the code for evacuating the intake manifold further comprises:
   code for closing the intake throttle valve during evacuation of the intake manifold.

* * * * *